(12) United States Patent
Kondo et al.

(10) Patent No.: US 12,085,098 B2
(45) Date of Patent: Sep. 10, 2024

(54) MULTI-CONTROL VALVE UNIT

(71) Applicant: KAWASAKI JUKOGYO KABUSHIKI KAISHA, Kobe (JP)

(72) Inventors: Akihiro Kondo, Kobe (JP); Yoshiyuki Tode, Kobe (JP); Koki Mibu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 221 days.

(21) Appl. No.: 17/772,184

(22) PCT Filed: Oct. 21, 2020

(86) PCT No.: PCT/JP2020/039492
§ 371 (c)(1),
(2) Date: Apr. 27, 2022

(87) PCT Pub. No.: WO2021/085257
PCT Pub. Date: May 6, 2021

(65) Prior Publication Data
US 2022/0403857 A1   Dec. 22, 2022

(30) Foreign Application Priority Data
Oct. 28, 2019   (JP) .................. 2019-195134

(51) Int. Cl.
*F15B 13/044*   (2006.01)
*F15B 15/18*   (2006.01)
*F16K 11/22*   (2006.01)
*F16K 11/24*   (2006.01)

(52) U.S. Cl.
CPC ............ *F15B 13/044* (2013.01); *F15B 15/18* (2013.01); *F16K 11/22* (2013.01); *F16K 11/24* (2013.01)

(58) Field of Classification Search
CPC .... F15B 13/044; F15B 13/0442; F15B 15/18; F16K 11/22; F16K 11/24; F16K 11/07; Y10T 137/87885
See application file for complete search history.

(56) References Cited

U.S. PATENT DOCUMENTS 4,718,451 A * 1/1988 Kosugi ............... F15B 13/0814
                                                                  137/884
2018/0135766 A1* 5/2018 Miyazoe ............. F15B 13/0871
2020/0208746 A1* 7/2020 Miyamoto ............. F16K 11/07

FOREIGN PATENT DOCUMENTS

| JP | S54-45465 A | 4/1979 |
| JP | H02-62405 A | 3/1990 |
| JP | 2015-148300 A | 8/2015 |

* cited by examiner

*Primary Examiner* — Hailey K. Do
(74) *Attorney, Agent, or Firm* — Oliff PLC

(57) ABSTRACT

A multi-control valve unit includes a housing with built-in spools that are parallel to each other. The housing includes pilot chambers formed therein, the pilot chambers corresponding to both ends of the spools. Solenoid proportional valves are mounted to the housing, such that the solenoid proportional valves are connected to the respective pilot chambers. A hydraulic pressure generator is mounted to the housing, such that the hydraulic pressure generator is connected to the solenoid proportional valves. The hydraulic pressure generator includes an electric motor and a pump.

3 Claims, 5 Drawing Sheets

MULTI-CONTROL VALVE UNIT

CROSS-REFERENCE TO RELATED APPLICATIONS

This is a National Phase of International Patent Application No. PCT/JP2020/039492 filed Oct. 21, 2020, which in turn claims the benefit of Japanese Patent Application No. 2019-195134 filed Oct. 28, 2019. The disclosure of the prior applications is hereby incorporated by reference herein in its entirety.

TECHNICAL FIELD

The present invention relates to a multi-control valve unit.

BACKGROUND ART

Conventionally, in a construction machine or the like, hydraulic oil is supplied from a hydraulic pump to hydraulic actuators via control valves. For example, Patent Literature 1 discloses a multi-control valve unit in which the control valves are integrated together (in Patent Literature 1, the multi-control valve unit is referred to as a "hydraulic control valve group").

Specifically, the multi-control valve unit includes spools that are parallel to each other and a housing with these spools built therein. Each spool and a part of the housing around the spool form one control valve.

CITATION LIST

Patent Literature

PTL 1: Japanese Laid-Open Patent Application Publication No. 2015-148300

SUMMARY OF INVENTION

Technical Problem

In general, each spool is moved by pilot pressure applied to both ends of the spool. Accordingly, pilot chambers corresponding to both ends of the spools are formed inside the housing. Also, in a case where the pilot pressure is adjusted by solenoid proportional valves, the solenoid proportional valves are mounted to the housing, such that the solenoid proportional valves are connected to the respective pilot chambers.

The solenoid proportional valves need to be supplied with primary pressure. In many hydraulic circuits, a variable displacement main pump to supply the hydraulic oil to the hydraulic actuators and a fixed displacement auxiliary pump to supply the primary pressure to the solenoid proportional valves are used. The main pump and the auxiliary pump are driven by a single prime mover (an engine or an electric motor).

However, in the above-described configuration, even when the supply of the hydraulic oil to the hydraulic actuators is unnecessary and the delivery flow rate of the main pump is minimized, the auxiliary pump still delivers the hydraulic oil at a certain flow rate. That is, the motive power of the prime mover is always consumed to drive the auxiliary pump.

In view of the above, an object of the present invention is to provide a multi-control valve unit that makes it possible to suppress the consumption of the motive power of a prime mover that drives a main pump.

Solution to Problem

In order to solve the above-described problems, a multi-control valve unit according to the present invention includes: a housing with built-in spools that are parallel to each other, the housing including pilot chambers formed therein, the pilot chambers corresponding to both ends of the spools; solenoid proportional valves mounted to the housing, such that the solenoid proportional valves are connected to the respective pilot chambers; and a hydraulic pressure generator mounted to the housing, such that the hydraulic pressure generator is connected to the solenoid proportional valves, the hydraulic pressure generator including an electric motor and a pump.

According to the above configuration, inside the multi-control valve unit, primary pressure can be supplied to the solenoid proportional valves. For this reason, the prime mover, which drives the main pump to supply the hydraulic oil to the hydraulic actuators via the multi-control valve unit, need not be additionally provided with an auxiliary pump. This makes it possible to suppress the consumption of the motive power of the prime mover. In addition, since the electric motor of the hydraulic pressure generator may be operated only when necessary only for a necessary flow rate, overall energy consumption can be reduced.

Advantageous Effects of Invention

The present invention makes it possible to suppress the consumption of the motive power of a prime mover that drives a main pump.

DESCRIPTION OF EMBODIMENTS

Embodiment 1

Figure 1:
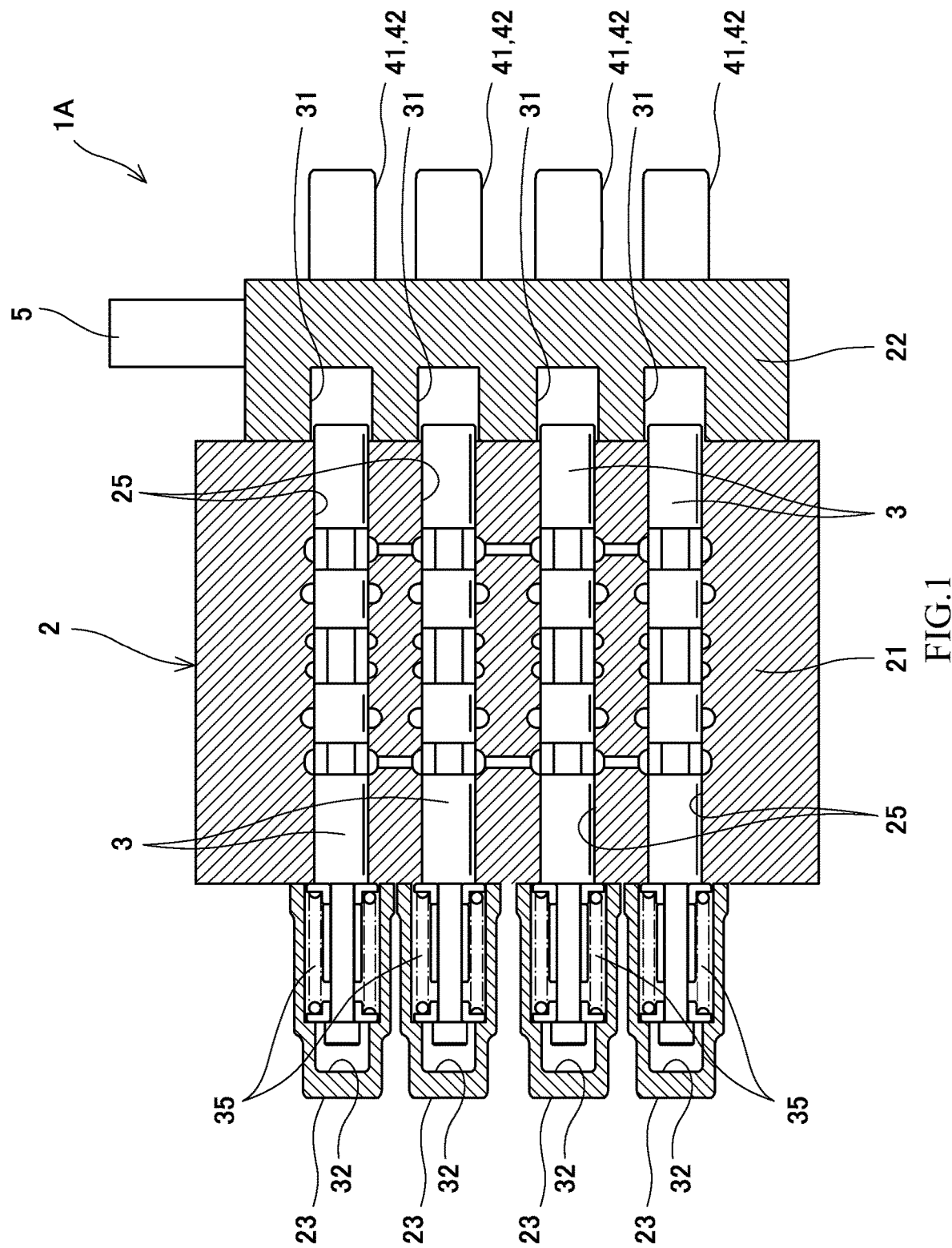
FIG. 1 is a sectional view of a multi-control valve unit according to Embodiment 1 of the present invention.
Figure 2:
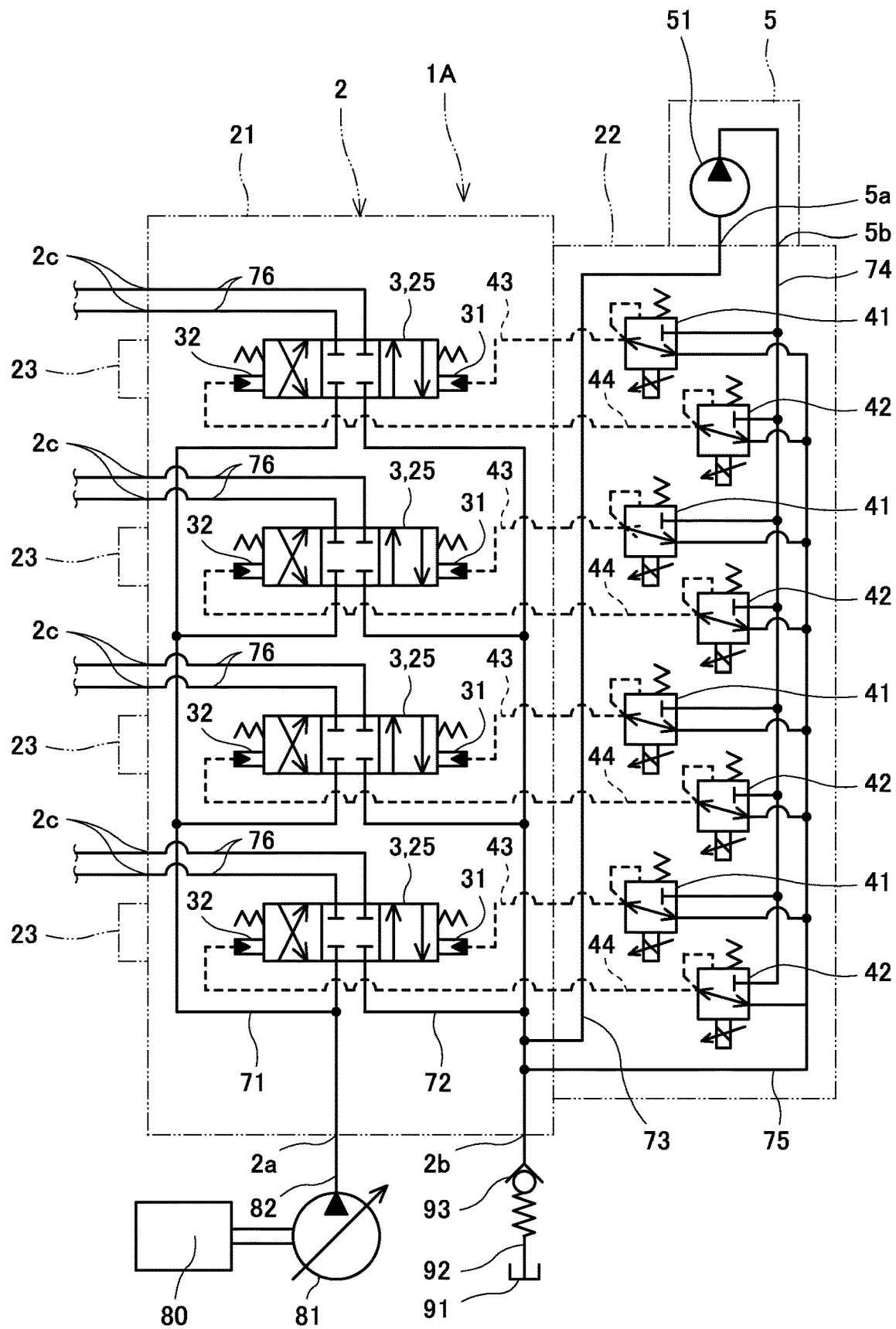
FIG. 2 shows a hydraulic circuit including the multi-control valve unit shown in FIG. 1.

FIG. 1 shows a multi-control valve unit 1A according to Embodiment 1 of the present invention, and FIG. 2 shows a hydraulic circuit including the multi-control valve unit 1A.

The multi-control valve unit 1A includes: spools 3, which are parallel to each other; a housing 2 with the spools 3 built therein; and a hydraulic pressure generator 5 mounted to the housing 2. Each spool 3 and a part of the housing 2 around the spool 3 form one control valve. In FIG. 1 and FIG. 2, the number of spools 3 is four. However, the number of spools 3 is not particularly limited, so long as the number of spools 3 is two or more.

As shown in FIG. 2, hydraulic oil is supplied from a main pump 81 to unshown hydraulic actuators via the multi-control valve unit 1A. The hydraulic actuators discharge the hydraulic oil to a tank 91 via the multi-control valve unit 1A.

The main pump 81 is a variable displacement pump (a swash plate pump or a bent axis pump). The main pump 81 is driven by a prime mover 80. The prime mover 80 may be an engine (an internal combustion engine), or may be an electric motor.

In the present embodiment, the housing 2 includes: a housing body 21 provided with through-holes 25, in which the respective spools 3 are inserted; a cover 22 disposed on one side of the housing body 21 in the axial direction of the spools 3; and caps 23 disposed on the other side of the housing body 21 in the axial direction of the spools 3. Each spool 3 is slidably held by a corresponding one of the through-holes 25.

The housing body 21 has a rectangular parallelepiped shape with two end surfaces (in FIG. 1, an upper surface and a lower surface) and four side surfaces (in FIG. 1, a left side surface, a right side surface, and unshown two surfaces facing in a direction orthogonal to the plane of FIG. 1).

The cover 22 is fixed to a side surface of the housing body 21 in a manner to cover the through-holes 25 from one side of the axial direction of the spools 3. The caps 23 are fixed to a side surface of the housing body 21 in a manner to cover corresponding through-holes 25, respectively, from the other side of the axial direction of the spools 3.

As shown in FIG. 2, for each spool 3, a pair of supply/discharge ports 2c is formed on one side surface (a surface facing in a direction orthogonal to the plane of FIG. 1) of the housing body 21. The supply/discharge ports 2c are connected to a corresponding unshown hydraulic actuator by a pair of supply/discharge lines.

A pump port 2a and a tank port 2b are formed on one end surface of the housing body 21. The pump port 2a is connected to the main pump 81 by a pump line 82, and the tank port 2b is connected to the tank 91 by a tank line 92. In FIG. 2, the tank line 92 is provided with a check valve 93 whose cracking pressure is about 0.03 MPa to 0.8 MPa. The check valve 93 may be eliminated.

A pump passage 71 and a tank passage 72 are formed in the housing body 21. The pump passage 71 extends from the pump port 2a to the through-holes 25. The tank passage 72 extends from the through-holes 25 to the tank port 2b. In the housing body 21, for each through-hole 25, a pair of supply/discharge passages 76 is formed, which extends from the through-hole 25 to corresponding supply/discharge ports 2c.

As shown in FIG. 1, first pilot chambers 31 corresponding to one ends of the respective spools 3, and second pilot chambers 32 corresponding to the other ends of the respective spools 3, are formed inside the housing 2. In other words, one end of each spool 3 is exposed to a corresponding one of the first pilot chambers 31, and the other end of each spool 3 is exposed to a corresponding one of the second pilot chambers 32. In the present embodiment, the cover 22 forms the first pilot chambers 31, and the caps 23 form the respective second pilot chambers 32.

In each second pilot chamber 32, a spring 35 to keep the corresponding spool 3 in its neutral position is disposed. The spring 35 urges the spool 3 to return to the neutral position both when the spool 3 has shifted to one side in the axial direction and when the spool 3 has shifted to the other side in the axial direction. Since this structure is known, a detailed description thereof is omitted herein.

First solenoid proportional valves 41 are mounted to the cover 22, such that the first solenoid proportional valves 41 are connected to the respective first pilot chambers 31. Also, second solenoid proportional valves 42 are mounted to the cover 22, such that the second solenoid proportional valves 42 are connected to the respective second pilot chambers 32. Although not illustrated, the first solenoid proportional valves 41 and the second solenoid proportional valves 42 are arranged in a direction orthogonal to the plane of the drawing. In other words, the first solenoid proportional valves 41 and the second solenoid proportional valves 42 are arranged in two lines.

In FIG. 2, each of the first solenoid proportional valves 41 and the second solenoid proportional valves 42 is a direct proportional valve that outputs secondary pressure indicating a positive correlation with a command current. Alternatively, each of the first solenoid proportional valves 41 and the second solenoid proportional valves 42 may be an inverse proportional valve that outputs secondary pressure indicating a negative correlation with the command current.

First pilot lines 43 are formed in the cover 22. From a secondary pressure port of each first solenoid proportional valve 41, one of the first pilot lines 43 extends to a corresponding one of the first pilot chambers 31. In FIG. 2, the first pilot chambers 31 are drawn inside the housing body 21 due to the nature of illustration of hydraulic symbols of control valves. However, actual positions of the first pilot chambers 31 are outside the housing body 21 as shown in FIG. 1. The same applies to the second pilot chambers 32.

Second pilot lines 44 are formed in the housing body 21 and the cover 22. From a secondary pressure port of each second solenoid proportional valve 42, one of the second pilot lines 44 extends to a corresponding one of the second pilot chambers 32. To be more specific, the second pilot lines 44 penetrate the housing body 21 in a manner parallel to the through-holes 25.

The aforementioned hydraulic pressure generator 5 is mounted to the cover 22, such that the hydraulic pressure generator 5 is connected to the first solenoid proportional valves 41 and the second solenoid proportional valves 42. Specifically, the hydraulic pressure generator 5 includes a suction port 5a and a discharge port 5b.

A suction passage 73 extending from the aforementioned tank passage 72 to the suction port 5a is formed in the housing body 21 and the cover 22. Also, a primary pressure passage 74 extending from the discharge port 5b to a primary pressure port of each of the first solenoid proportional valves 41 and the second solenoid proportional valves 42 is formed in the cover 22. Further, a tank passage 75 extending from a tank port of each of the first solenoid proportional valves 41 and the second solenoid proportional valves 42 to the aforementioned tank passage 72 is formed in the housing body 21 and the cover 22.

Figure 3:
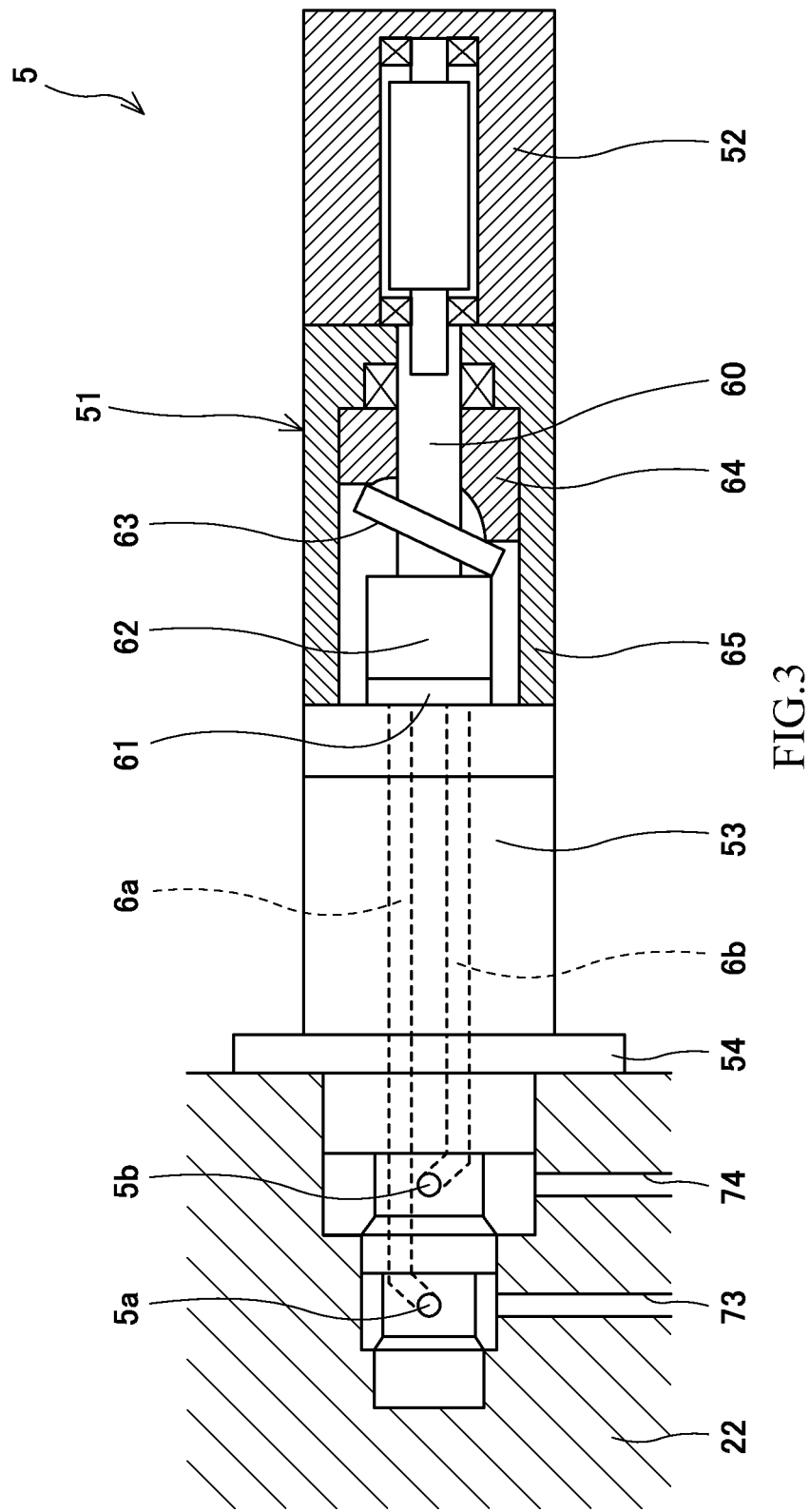
FIG. 3 is a sectional view of a hydraulic pressure generator.

As shown in FIG. 3, the hydraulic pressure generator 5 includes a pump 51 and an electric motor 52. The electric motor 52 drives the pump 51. In the present embodiment, the hydraulic pressure generator 5 includes a manifold 53, which is disposed at the opposite side to the electric motor 52, with the pump 51 positioned between the manifold 53 and the electric motor 52. The manifold 53, the pump 51, and the electric motor 52 are integrated together, i.e., a cartridge type.

In the present embodiment, the pump 51 is a swash plate pump. Alternatively, the pump 51 may be a bent axis pump. Further alternatively, the pump 51 may be a pump different from an axial pump, such as a gear pump or a vane pump.

Specifically, the pump 51 includes: a rotating shaft 60 coupled to the output shaft of the electric motor 52; a cylinder block 62, which is fixed to the rotating shaft 60 and which holds pistons (not shown); a valve plate 61, on which the cylinder block 62 slides; a swash plate 63, on which shoes (not shown) mounted to the pistons slide; and a support base 64, which supports the swash plate 63. These elements are accommodated in a case 65.

A flange 54 is provided at the middle of the manifold 53. A distal-side part of the manifold 53, the distal-side part being positioned closer to the distal end of the manifold 53 than the flange 54, is inserted in a recess formed in the cover 22. The distal-side part is provided with the aforementioned suction port 5a and discharge port 5b. The flange 54 is fixed to the cover 22 by an unshown bolt.

A suction passage 6a and a discharge passage 6b are formed in the manifold 53. Through the suction passage 6a, a suction hole of the valve plate 61 and the suction port 5a communicate with each other. Through the discharge passage 6b, a discharge hole of the valve plate 61 and the discharge port 5b communicate with each other.

In the multi-control valve unit 1A configured as described above, inside the multi-control valve unit 1A, primary pressure can be supplied to the first solenoid proportional valves 41 and the second solenoid proportional valves 42. For this reason, the prime mover 80, which drives the main pump 81, need not be additionally provided with an auxiliary pump. This makes it possible to suppress the consumption of the motive power of the prime mover 80. For example, in a case where the prime mover 80 is an engine, the fuel efficiency of the prime mover 80 is improved. In addition, since the electric motor 52 of the hydraulic pressure generator 5 may be operated only when necessary only for a necessary flow rate (such that the pump 51 delivers the hydraulic oil only at the necessary flow rate), overall energy consumption can be reduced.

In conventional hydraulic circuits, a prime mover that drives a main pump is additionally provided with an auxiliary pump, and the main pump and the auxiliary pump are often disposed coaxially. In such a configuration, a drive unit including the pumps and the prime mover is elongated, and a relatively wide space is necessary for the installation of the drive unit. On the other hand, in the multi-control valve unit 1A of the present embodiment, the drive unit is shortened since the drive unit does not include the auxiliary pump. Therefore, the installation of the drive unit does not require so much space.

Embodiment 2

Figure 4:
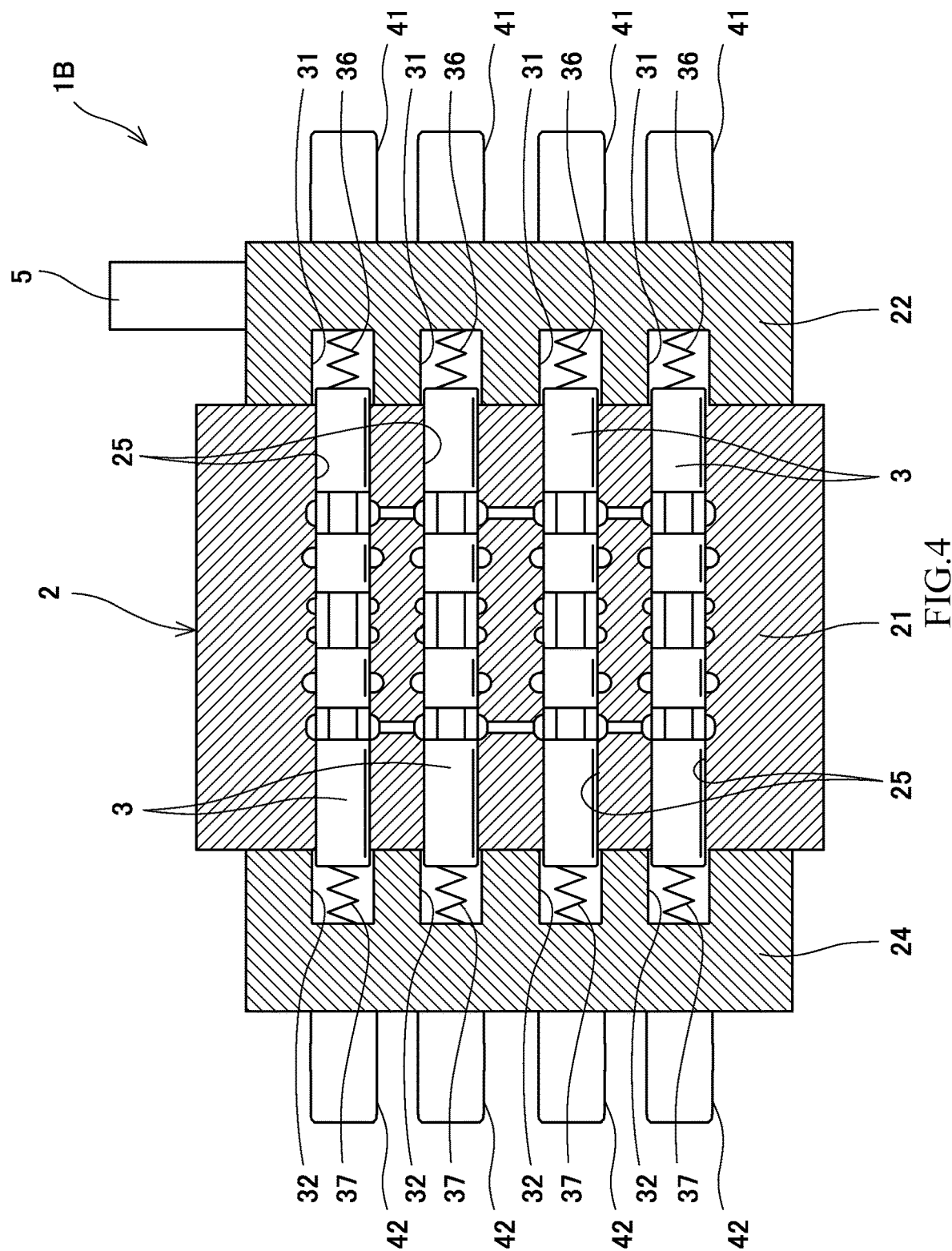
FIG. 4 is a sectional view of a multi-control valve unit according to Embodiment 2 of the present invention.
Figure 5:
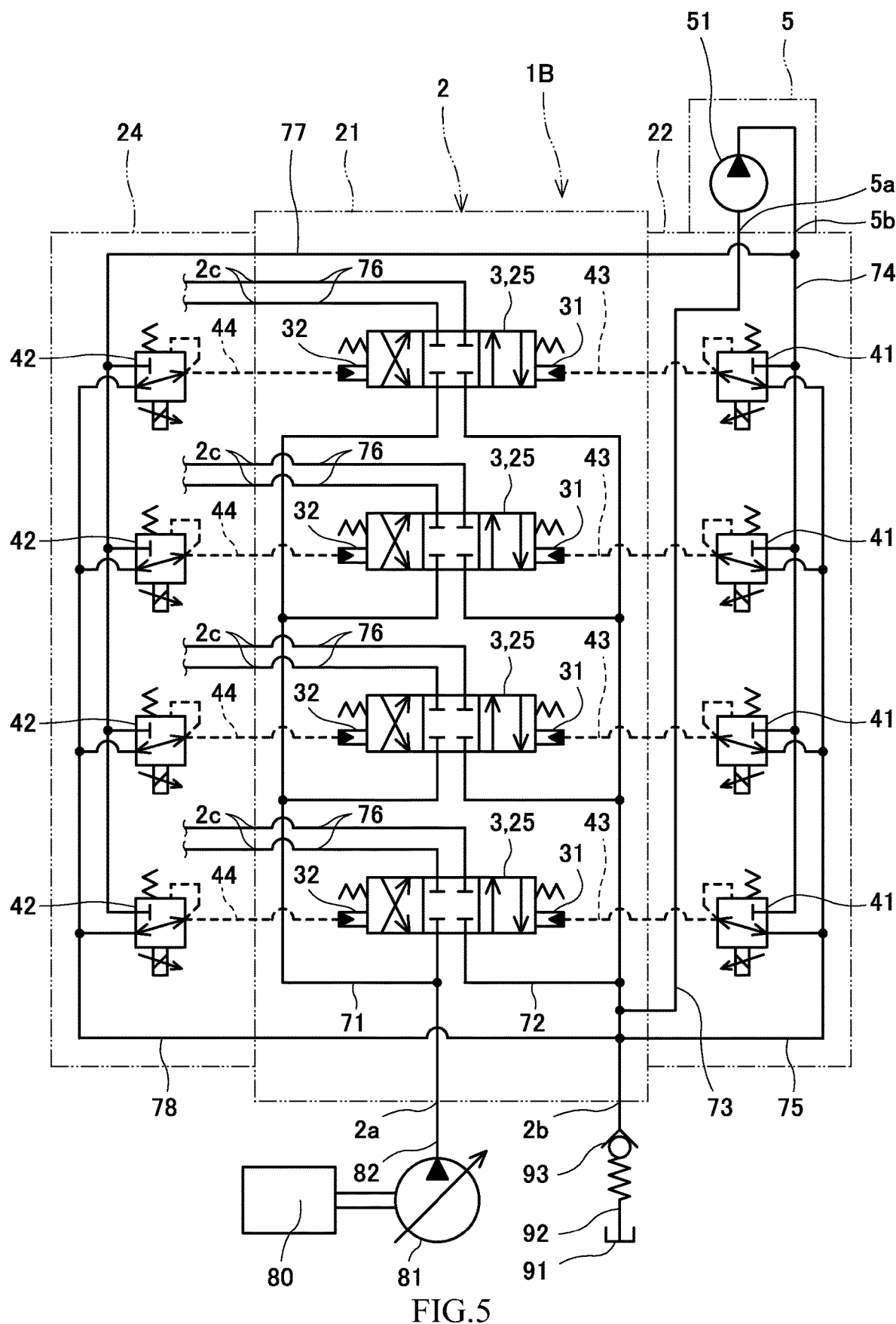
FIG. 5 shows a hydraulic circuit including the multi-control valve unit shown in FIG. 4.

FIG. 4 shows a multi-control valve unit 1B according to Embodiment 2 of the present invention, and FIG. 5 shows a hydraulic circuit including the multi-control valve unit 1B. In the present embodiment, the same components as those described in Embodiment 1 are denoted by the same reference signs as those used in Embodiment 1, and repeating the same descriptions is avoided.

In the present embodiment, the housing 2 includes a first cover 22 as the cover 22 described in Embodiment 1. The housing 2 further includes a second cover 24 instead of the caps 23.

The second cover 24 is configured in the same manner as the first cover 22. Specifically, (while the first cover 22 is fixed to a side surface of the housing body 21 in a manner to cover the through-holes 25 from one side of the axial direction of the spools 3) the second cover 24 is fixed to a side surface of the housing body 21 in a manner to cover the through-holes 25 from the other side of the axial direction of the spools 3.

The second cover 24 forms the second pilot chambers 32. The second solenoid proportional valves 42 are mounted not to the first cover 22, but to the second cover 24, such that the second solenoid proportional valves 42 are connected to the respective second pilot chambers 32. Second pilot lines 44 are formed in the second cover 24. From a secondary pressure port of each second solenoid proportional valve 42, one of the second pilot lines 44 extends to a corresponding one of the second pilot chambers 32.

In the present embodiment, the primary pressure passage 74 formed in the first cover 22 extends from the discharge port 5b of the hydraulic pressure generator 5 to the primary pressure port of each of the first solenoid proportional valves 41, and the tank passage 75 formed in the housing body 21 and the first cover 22 extends from the tank port of each of the first solenoid proportional valves 41 to the tank passage 72.

Further, in the present embodiment, a primary pressure passage 77 branched off from the primary pressure passage 74 and extending to the primary pressure port of each of the second solenoid proportional valves 42 is formed in the first cover 22, the housing body 21, and the second cover 24. That is, the upstream portion of the primary pressure passage 77 penetrates the housing body 21. Further, a tank passage 78 extending from the tank port of each of the second solenoid proportional valves 42 to the tank passage 72 is formed in the housing body 21 and the second cover 24.

Still further, in the present embodiment, a spring 36 is disposed in each first pilot chamber 31 and a spring 37 is disposed in each second pilot chamber 32. The springs 36 and 37 serve to keep the spool 3 in its neutral position. Alternatively, instead of the springs 36 and 37, the spring 35 configured as shown in FIG. 1 may be disposed either in each first pilot chamber 31 or in each second pilot chamber 32.

The present embodiment provides the same advantageous effects as those provided by Embodiment 1. In addition, unlike Embodiment 1, the housing body 21 of the present embodiment need not be provided with the second pilot lines 44. Therefore, the housing body 21 can be reduced in size compared to Embodiment 1.

Other Embodiments

The present invention is not limited to the above-described embodiments. Various modifications can be made without departing from the scope of the present invention.

For example, the hydraulic pressure generator 5 need not be mounted to the cover 22, but may be mounted to the housing body 21. However, in a case where the hydraulic pressure generator 5 is mounted to the cover 22 together with the first solenoid proportional valves 41 as in the above-described embodiments, the primary pressure passage extending from the discharge port 5b of the hydraulic pressure generator 5 to the first solenoid proportional valves 41 can be readily configured only inside the cover 22. Particularly in a case where the second solenoid proportional valves 42 are mounted to the cover 22 as in Embodiment 1, the primary pressure passage extending from the discharge port 5b of the hydraulic pressure generator 5 to all the solenoid proportional valves can be configured inside the cover 22.

Summary

A multi-control valve unit according to the present invention includes: a housing with built-in spools that are parallel to each other, the housing including pilot chambers formed therein, the pilot chambers corresponding to both ends of the spools; solenoid proportional valves mounted to the housing, such that the solenoid proportional valves are connected to the respective pilot chambers; and a hydraulic pressure generator mounted to the housing, such that the hydraulic pressure generator is connected to the solenoid proportional valves, the hydraulic pressure generator including an electric motor and a pump.

According to the above configuration, inside the multi-control valve unit, primary pressure can be supplied to the solenoid proportional valves. For this reason, the prime mover, which drives the main pump to supply the hydraulic oil to the hydraulic actuators via the multi-control valve unit, need not be additionally provided with an auxiliary pump. This makes it possible to suppress the consumption of the motive power of the prime mover. In addition, since the electric motor of the hydraulic pressure generator may be operated only when necessary only for a necessary flow rate, overall energy consumption can be reduced.

The pilot chambers may include first pilot chambers and second pilot chambers, the first pilot chambers corresponding to one ends of the respective spools, the second pilot chambers corresponding to the other ends of the respective spools. The solenoid proportional valves may include first solenoid proportional valves and second solenoid proportional valves, the first solenoid proportional valves being connected to the respective first pilot chambers, the second solenoid proportional valves being connected to the respective second pilot chambers. The housing may include a housing body and a cover, the housing body being provided with through-holes, in which the respective spools are inserted, the cover being fixed to the housing body in a manner to cover the through-holes from one side of an axial direction of the spools, the cover forming the first pilot chambers. The first solenoid proportional valves and the hydraulic pressure generator may be mounted to the cover. According to this configuration, a primary pressure passage extending from the hydraulic pressure generator to the first solenoid proportional valves can be readily configured only inside the cover.

For example, a pump passage and a tank passage may be formed in the housing body, the pump passage extending from a pump port to the through-holes, the tank passage extending from the through-holes to a tank port. The hydraulic pressure generator may include a suction port and a discharge port. A suction passage extending from the tank passage to the suction port may be formed in the housing body and the cover. A primary pressure passage extending from the discharge port to the first solenoid proportional valves may be formed in the cover.

The cover may be a first cover. The housing may include a second cover that is fixed to the housing body in a manner to cover the through-holes from the other side of the axial direction of the spools, the second cover forming the second pilot chambers. The second solenoid proportional valves may be mounted to the second cover. According to this configuration, the housing body can be reduced in size compared to a case where the first solenoid proportional valves and the second solenoid proportional valves are mounted to a single cover.

The invention claimed is:

1. A multi-control valve unit comprising:
a housing with built-in spools that are parallel to each other, the housing including first pilot chambers and second pilot chambers formed therein, the first pilot chambers corresponding to one end of the built-in spools, the second pilot chambers corresponding to an other end of the built-in spools;
first solenoid proportional valves mounted to the housing, such that the first solenoid proportional valves are connected to the respective first pilot chambers;
second solenoid proportional valves mounted to the housing, such that the second solenoid proportional valves are connected to the respective second pilot chambers; and
a hydraulic pressure generator mounted to the housing, such that the hydraulic pressure generator is connected to the first solenoid proportional valves and the second solenoid proportional valves, the hydraulic pressure generator including an electric motor and a pump, wherein
the housing includes a housing body and a cover, the housing body being provided with through-holes, in which the respective built-in spools are inserted, the cover being fixed to the housing body in a manner to cover the through-holes from one side of an axial direction of the built-in spools, the cover forming the first pilot chambers, and
the first solenoid proportional valves and the hydraulic pressure generator are mounted to the cover.

2. The multi-control valve unit according to claim 1, wherein
a pump passage and a tank passage are formed in the housing body, the pump passage extending from a pump port to the through-holes, the tank passage extending from the through-holes to a tank port,
the hydraulic pressure generator includes a suction port and a discharge port,
a suction passage extending from the tank passage to the suction port is formed in the housing body and the cover, and
a primary pressure passage extending from the discharge port to the first solenoid proportional valves is formed in the cover.

3. The multi-control valve unit according to claim 1, wherein
the cover is a first cover,
the housing includes a second cover that is fixed to the housing body in a manner to cover the through-holes from the other side of the axial direction of the built-in spools, the second cover forming the second pilot chambers, and
the second solenoid proportional valves are mounted to the second cover.

* * * * *